(12) United States Patent
Sharp

(10) Patent No.: US 9,574,320 B2
(45) Date of Patent: Feb. 21, 2017

(54) BLENDED POSITION SOLUTIONS

(71) Applicant: Trimble Navigation Limited, Sunnyvale, CA (US)

(72) Inventor: Alan Sharp, Superior, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 1 day.

(21) Appl. No.: 14/225,702

(22) Filed: Mar. 26, 2014

(65) Prior Publication Data

US 2015/0274157 A1    Oct. 1, 2015

(51) Int. Cl.
| | |
|---|---|
| *B60W 30/00* | (2006.01) |
| *E02F 3/84* | (2006.01) |
| *E01C 19/00* | (2006.01) |
| *G01C 15/06* | (2006.01) |
| *G01S 17/66* | (2006.01) |
| *G01S 17/87* | (2006.01) |

(52) U.S. Cl.
CPC ............. *E02F 3/841* (2013.01); *E01C 19/004* (2013.01); *G01C 15/06* (2013.01); *G01S 17/66* (2013.01); *G01S 17/87* (2013.01)

(58) Field of Classification Search
CPC .................................................. E02F 9/2045
USPC .............................................. 700/23; 701/23
See application file for complete search history.

(56) References Cited

U.S. PATENT DOCUMENTS

| | | | | |
|---|---|---|---|---|
| 5,483,457 A | * | 1/1996 | Shibata .................. | G01C 21/28 701/472 |
| 5,549,412 A | * | 8/1996 | Malone ................. | E01C 19/004 404/84.1 |
| 6,424,914 B1 | * | 7/2002 | Lin ....................... | G01C 21/165 342/357.29 |
| 6,450,267 B2 | | 9/2002 | Ohtomo et al. | |
| 7,191,254 B2 | * | 3/2007 | Yamada .............. | G06F 11/2236 708/100 |
| 7,307,710 B2 | | 12/2007 | Gatsios et al. | |
| 7,423,742 B2 | | 9/2008 | Gatsios et al. | |
| 8,494,561 B2 | | 7/2013 | Berg | |
| 9,309,631 B2 | | 4/2016 | Hill et al. | |
| 2002/0015439 A1 | * | 2/2002 | Kohli ..................... | G01C 21/26 375/148 |
| 2002/0120394 A1 | * | 8/2002 | Rayne .................... | G01S 1/045 701/408 |
| 2002/0126044 A1 | * | 9/2002 | Gustafson ........... | G01C 21/165 342/357.59 |

(Continued)

OTHER PUBLICATIONS

U.S. Appl. No. 14/225,702, Michael E. Butler.*

(Continued)

*Primary Examiner* — Michael McCullough
*Assistant Examiner* — Michael E Butler
(74) *Attorney, Agent, or Firm* — Swanson & Bratschun, L.L.C.

(57) ABSTRACT

Novel tools and techniques for determining a blended position solution for a vehicle, using data from multiple positioning devices, some of which can be external to the vehicle. Some techniques allow a control system of a vehicle to transition from receiving position data from one positioning device to receiving data from another device without ceasing operation and/or while limiting any resulting discontinuity the position solution (and any resulting work performed by the vehicle) to within acceptable tolerances.

30 Claims, 9 Drawing Sheets

(56) References Cited

U.S. PATENT DOCUMENTS

| | | | | |
|---|---|---|---|---|
| 2007/0205941 | A1* | 9/2007 | Riley | G01S 19/25 342/357.29 |
| 2008/0047170 | A1* | 2/2008 | Nichols | E02F 3/435 37/348 |
| 2008/0060825 | A1* | 3/2008 | Unruh | A01B 69/004 172/2 |
| 2008/0088507 | A1* | 4/2008 | Smith | G01C 21/165 342/386 |
| 2008/0208461 | A1* | 8/2008 | Gharsalli | G01C 21/32 701/425 |
| 2008/0279421 | A1* | 11/2008 | Hamza | B64G 1/646 382/103 |
| 2009/0093959 | A1* | 4/2009 | Scherzinger | G01C 21/165 701/470 |
| 2009/0287414 | A1* | 11/2009 | Vickery | G01C 21/165 701/500 |
| 2009/0315772 | A1* | 12/2009 | Wengler | G01S 19/05 342/357.29 |
| 2010/0057321 | A1* | 3/2010 | Randler | B60W 30/16 701/96 |
| 2010/0070178 | A1* | 3/2010 | Wang | A01B 69/007 701/472 |
| 2010/0085238 | A1* | 4/2010 | Muller-Frahm | G01S 11/12 342/70 |
| 2010/0103041 | A1* | 4/2010 | Tomita | G01S 19/27 342/357.66 |
| 2010/0117894 | A1* | 5/2010 | Velde | G01S 19/54 342/357.36 |
| 2010/0194634 | A1* | 8/2010 | Biacs | G01S 19/23 342/357.31 |
| 2011/0148695 | A1* | 6/2011 | Mizuochi | G01S 19/40 342/357.23 |
| 2012/0166137 | A1* | 6/2012 | Grasser | G01C 15/00 702/150 |
| 2012/0215381 | A1* | 8/2012 | Wang | A01D 41/1278 701/2 |
| 2012/0246977 | A1* | 10/2012 | Proeber | E02F 3/841 37/197 |
| 2012/0259543 | A1* | 10/2012 | Shirai | G01S 19/40 701/468 |
| 2013/0006484 | A1 | 1/2013 | Avitzur et al. | |
| 2013/0261908 | A1 | 10/2013 | Jang | |
| 2014/0107883 | A1 | 4/2014 | Fritz et al. | |
| 2014/0214317 | A1* | 7/2014 | Sanjay | G01C 21/165 701/469 |
| 2015/0275482 | A1 | 10/2015 | Hill et al. | |
| 2016/0186388 | A1 | 6/2016 | Hill et al. | |

OTHER PUBLICATIONS

U.S. Appl. No. 14/225,706, filed Mar. 26, 2014; 40 pages.

U.S. Appl. No. 14/225,706, Notice of Allowance mailed Dec. 4, 2015; 20 pages.

U.S. Appl. No. 15/065,187, NonFinal Office Action mailed Apr. 22, 2016; 14 pages.

U.S. Appl. No. 15/065,187, Notice of Allowance mailed Jun. 6, 2016; 21 pages.

* cited by examiner

BLENDED POSITION SOLUTIONS

CROSS REFERENCE TO RELATED APPLICATION

This application may be related to U.S. application Ser. No. 14/225,706, filed on Mar. 26, 2014 by Hill et al., titled "Enhanced Control of Road Construction Equipment" and assigned to Caterpillar Trimble Control Technologies, LLC (the "Enhanced Control Application"), the entire disclosure of which is incorporated by reference herein.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to road construction, and more particularly, to enhanced control systems that can employ multiple positioning devices for control of equipment.

BACKGROUND

A variety of different machines are used in the construction of roads and other infrastructure. Such machines (referred to collectively herein as "road-forming machines") can include, without limitation, equipment that displaces, shapes, and/or forms the underlying roadbed, such as earthmovers, motor graders ("motor graders") and the like. Road-forming machines can also include machines that deposit and/or form the actual roadway material, such as asphalt pavers, which deposit asphalt on a road surface, slipform pavers, which extrude or otherwise shape concrete on a road surface, and/or the like. Such road-forming machines are commonly controlled by advanced control systems that use high-precision positioning equipment to ensure that the machines shape the earth and/or the road surface consistent with an engineer's model for the project.

In some cases, such machines might include onboard positioning equipment, such as a global navigation satellite system ("GNSS") receiver. Generally, however, such receivers do not provide the level of precision necessary for these types of projects. As a result, many such systems employ external positioning devices, such as total stations (of which many are commercially available from Trimble Navigation) to provide precise positioning information to the machine's control system. The use of such external devices, while providing precise positioning information, is not problem-free. For example, in many cases, a total station (or other positioning device) will need to be moved from one location to continue to provide valid positioning information to the road-forming machine as the machine moves along the path of a road. Typically, the machine will have to cease operation while the positioning device is moved and calibrated at the new location. This interruption greatly reduces the efficiency of the construction operation, adding time and expense to the project. This inefficiency can be mitigated somewhat through the use of multiple positioning devices, but the inability of a control system to receive input from more than one device simultaneously means that the machine will still have to cease operation while it transitions from one positioning device to another.

Further, every time the positioning device is moved in such projects, or a control system switches from one positioning device to another, any error in the data received from either device can introduce a discontinuity in the road surface. Such errors can result from imprecision of the calibration of positioning devices, thermal effects (which can cause minor refraction of lasers used to determine the machine's position by the positioning devices), wind and other environmental effects (such as vibration caused by other machinery working nearby), and the like. Continuity of the road surface is often of primary importance (to whatever degree of precision is appropriate, depending on the step in the process). Merely by way of example, in many cases, there is a relatively large degree of freedom in variance from the model of the project, so that a road surface a few millimeters higher or lower than the elevation specified by the model is acceptable. On the other hand, a discontinuity of even a few millimeters in the surface of a road can create significant issues (the least of which is a severe bump for any cars that travel the road). Hence, conventional systems further degrade efficiency by requiring additional processes to prevent or remedy such discontinuities prior to approval by transportation authorities.

Accordingly, there is a need for control systems for road-forming machines that provide more robust positioning control.

BRIEF SUMMARY

Certain embodiments provide improved tools and techniques for controlling road-forming machines. In an aspect of particular embodiments, these tools allow a control system of a road-forming machine to transition from receiving position data from one positioning device to receiving data from another without ceasing operation and/or while limiting any resulting discontinuity in the formed road surface to within acceptable tolerances. The tools provided by various embodiments include, without limitation, road-forming machines, methods, computers and control systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible and/or non-transitory computer readable media (such as, to name but a few examples, optical media, magnetic media, and/or the like).

Merely by way of example, a road-forming machine (which might be a paving machine, motor grader, scraper, milling machine, trimmer, or any other machine capable of forming a road surface and/or the earth on which a road surface will be built) in accordance with one set of embodiments might comprise a locomotion system configured to move the road-forming machine, which can include, without limitation, wheels and/or tracks, as well as the apparatus for providing power and/or steering input to such wheels and/or tracks. The road-forming machine might also comprise a road-forming system configured to form a road surface continuously as the road-forming machine moves; the road-forming system might include, without limitation, a grader blade, a paving system, and/or the like.

In some cases, the road-forming machine might comprise a communication interface to provide communication with a plurality of position measurement devices and/or a control system comprising a processor, a non-transitory storage medium, and a set of instructions executable by the processor. Such instructions can include, without limitation, instructions to cause the road-forming machine to implement methods provided by other embodiments. Merely by way of example, in some embodiments, the set of instructions might comprise instructions to receive position data from two or more position measurement devices, including a first position measurement device and a second position measurement device. The set of instructions might further comprise instructions to control operation of the road-forming system, for example, based on determined positions of the road-forming system and a model stored on the non-transitory storage medium.

There might be further instructions to determine a first position of the road-forming system based on position data received from the first position measurement device, instructions to transition from the first position measurement device to the second position measurement device, and/or instructions to determine a second position of the road-forming system based on position data received from the second position measurement device. In some cases, the transition from the first position measurement device to the second position measurement device can be accomplished without interrupting movement of the road-forming machine or formation of the road surface and/or without introducing a discontinuity in the formed road surface greater than a specified threshold value.

Another set of embodiments provides computer systems, including without limitation control systems for road-forming machines. One exemplary control system might comprise one or more processors and a non-transitory computer readable medium in communication with the one or more processors. A further set of embodiments provides apparatus, which can include without limitation, a non-transitory computer readable medium having encoded thereon instructions for programming a such a control system. In either case, the computer readable medium having encoded thereon a set of instructions executable by the computer system to perform one or more operations, including without limitation operations consistent with methods provided by various embodiments.

An exemplary set of instructions might comprise instructions to receive position data from two or more position measurement devices, including a first position measurement device and a second position measurement device. The set of instructions could further include instructions to control operation of a locomotion system of the road-forming machine and a road-forming system of the road-forming machine to form a road surface continuously, e.g., based on determined positions of the road-forming system and a model stored on the non-transitory computer readable medium. The set of instructions might also include instructions to determine a first position of the road-forming system based on position data received from the first position measurement device, instructions to transition from the first position measurement device to the second position measurement device, and/or instructions to determine a second position of the road-forming system based on position data received from the second position measurement device. In some cases, this transition can be performed without interrupting movement of the road-forming machine or formation of the road surface, and/or without introducing a discontinuity in the road surface greater than a specified threshold value.

Yet another set of embodiments provides methods. One exemplary method might comprise forming a road surface with a road-forming machine, such as those described herein. Merely by way of example, a road-forming machine might comprise a locomotion system configured to move the road-forming machine, a road-forming system configured to form a road surface continually as the road-forming machine moves, a communication interface to provide communication with a plurality of position measurement devices, and/or a control system configured to control operation of the road-forming machine.

The method, then, might comprise receiving, e.g., with the control system, position data from two or more position measurement devices, including a first position measurement device and a second position measurement device. In some cases, the method further comprises controlling, with the control system, operation of the locomotion system and the road-forming system, for example, based on determined positions of the road-forming system and a model stored on the non-transitory storage medium. In particular embodiments, the method can include determining, with the control system, a first position of the road-forming system based on position data received from the first position measurement device; transitioning, with the control system, from the first position measurement device to the second position measurement device; and/or determining a second position of the road-forming system based on position data received from the second position measurement device. In a particular aspect, the transitioning operation can occur without interrupting movement of the road-forming machine or formation of the road surface and without introducing a discontinuity in the formed road surface greater than a specified threshold value.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Figure 1:
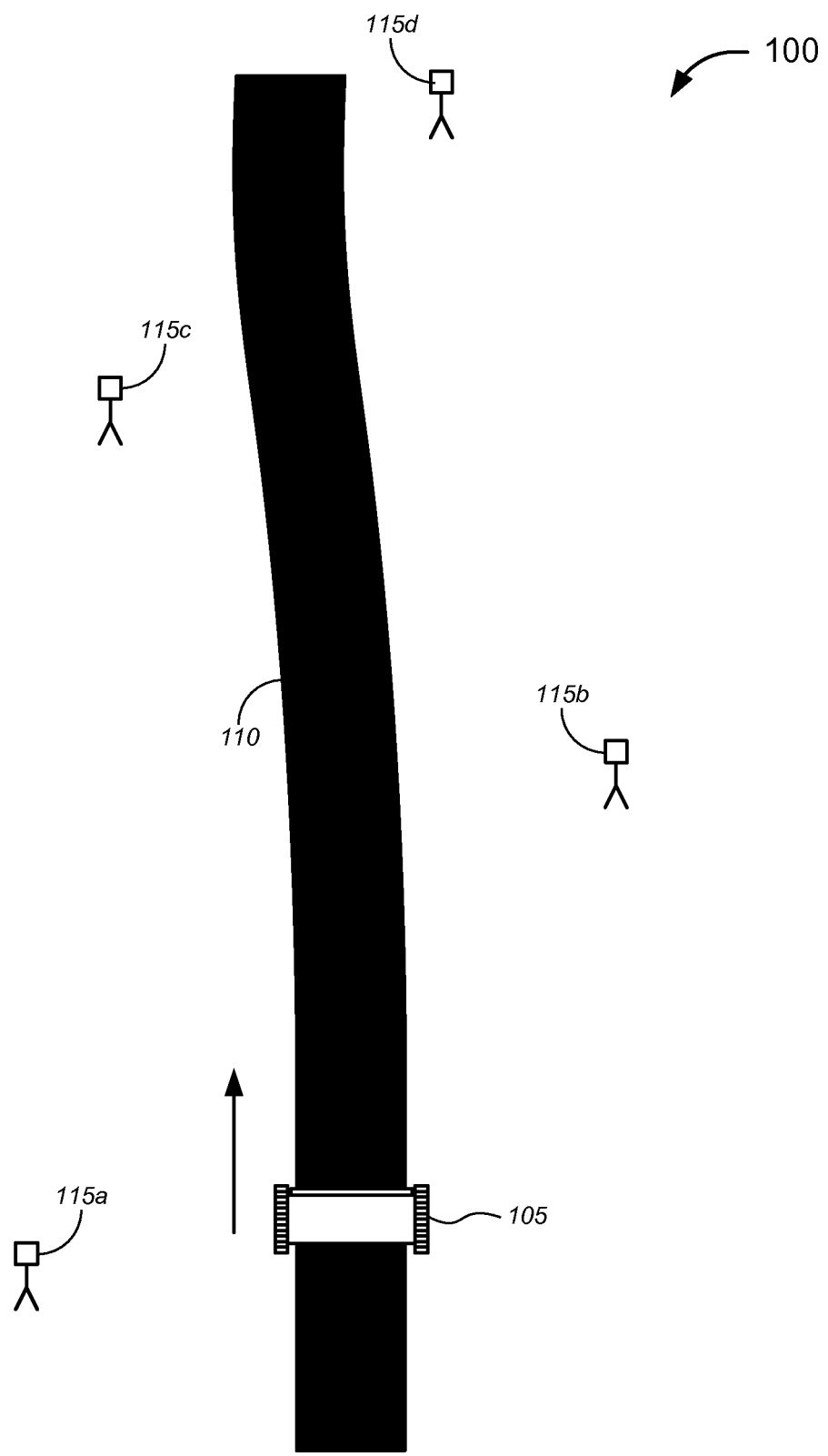
FIG. 1 illustrates a system for providing positioning information to a road-forming machine, in accordance with various embodiments.

Certain embodiments provide improved tools and techniques for controlling road-forming machines. In an aspect of particular embodiments, these tools allow a control system of a road-forming machine to transition from one positioning device to another without ceasing operation and while limiting any resulting discontinuity to within acceptable tolerances. For example, FIG. 1 (which is not drawn to scale) illustrates a system 100 for providing position information to a road-forming machine 105. As noted above, such road-forming machines 105 can include any number of machines or vehicles, such as, without limitation, equipment that displaces, shapes, and/or forms the underlying roadbed, such as earthmovers, motor graders, and the like, as well as machines that deposit and/or form the actual roadway material, such as asphalt pavers, which deposit asphalt on a road surface, slipform pavers, which extrude or otherwise shape concrete on a road surface, and/or the like. In the example illustrated by FIG. 1, the road-forming machine 105 might be an asphalt paver that deposits asphalt on an existing surface of a road 110 to improve that surface.

Typically, most road-forming operations (whether creating the underbed or applying the road surface) are designed using advanced modeling software, such as the Business Center—HCE™ package commercially available from Trimble Navigation Ltd. Using such software, an engineer can create a model for the road that accounts for the topography of the area, any technical or regulatory constraints (such as maximum allowable grade, and the like), and any other design features of the project. Such models generally are oriented to a local coordinate system, national grid, state plan, and/or global coordinate system, such as latitude/longitude/elevation. The road 110, then, is formed consistently with this model, to whatever degree of precision is required.

To ensure consistency between the formed road 110 and the design model, the location of the road-forming machine 105 relative to the coordinate system in use must be carefully managed. There are several techniques for managing the location of the machine 105. For example, the control system of the machine 105 itself might include a global navigation satellite system ("GNSS") receiver. Generally, however, an onboard GNSS receiver does not provide the precision necessary to conform sufficiently to the established model for the road 110. Accordingly, an accepted practice is to track the position of the machine 105 with one or more high-precision position measurement devices 115 (also referred to herein as "positioning devices"). Such position measurement devices 115 can include, without limitation, total stations such as those available from Trimble Navigation Ltd., rovers such as those disclosed in U.S. Pre Grant Pub. No. 2012-0166137-A1, the descriptions of which are incorporated herein by reference, or any other device capable of providing an external reference of the machine's 105 position. Such a position measurement device, e.g., 115a, after determining the position of the machine 105 (through whatever technique) can then communicate that position information to the control system of the machine 105 (or to another computer system that is responsible for determining the machine's 105 position and/or providing control information to the machine 105).

A variety of techniques are available for a position measurement device 115 to communicate position information to the machine 105. In some cases, standard communication interfaces, such as 2.4 GHz spread spectrum radios, IEEE 802.11x (WiFi) radios or cellular radios, might be installed in the position measurement device 115 and the control system of the machine 105. In other cases, proprietary single- or multi-channel radios might provide such communication. In any case, the position measurement device 115 provides position information to a control system (which might be located, but need not necessarily be located on the machine 105), which determines the position of the machine 105 based on the position information received from a position measurement device, such as device 115a.

As the machine 105 moves along the road, however, the position solution provided by a particular position measurement device 115a might degrade, because of the distance between the machine 105 and the device 115a, obscured sightlines between the machine 105 and the device 115b, or various other factors. For instance, position solution might degrade because of refraction caused by temperature gradations and moisture content in the air in the path of the light—this naturally limits the accuracy of optical measurement and tracking systems to a specific distance before which the refraction error is greater than the allowable tolerances of construction. Accordingly, the machine will need to obtain position information from a different position measurement device, e.g., 115b (which can be a different device from the device 115a or can be the same device moved to a different station). This process can continue, using devices 115c and 115d in sequence as the machine moves down the road 110. In a particular aspect, two (or more) devices might be used in a leapfrog fashion, such that a single position measurement device might serve as device 115a and device 115c, while another position measurement device might as device 115b and device 115d. In some applications, such as some concrete pavers, the machine might require two (or more) positioning devices at a time, for example, to track the left and right side of the machine at the same time; in such cases, the system 100 might need to leapfrog two sensors at a time.

Conventionally, the transition from obtaining position information from one device 115 to obtaining position information from another device 115 (or from the same device 115 at a different station) requires the machine 105 to be stopped and recalibrated. Further, because of minor error in the position solutions provided by one or the other (or both) of the devices 115, the calculated position of the machine 105 might experience a discontinuity during the transition. As noted above, both the need to cease operations and the potential for discontinuity can present problems for the project. Various embodiments, as described in further detail below, can avoid these problems by allowing the machine 105 to transition from one position measurement device (e.g., 115a) to another device (e.g., 115b) without ceasing operation and while maintaining continuity (to within a specified precision) in the calculation of the position of the machine 105.

While embodiments can provide position information in any of three dimensions (as described below), determination of elevation and/or cross-slope not of a road surface generally is of special importance in road forming operations (because inconsistencies in elevation and/or cross-slope of a road surface present the most significant problems in road forming). In an aspect, cross-slope can be determined by analyzing data from two or more sets of two positioning devices; for example, a first set of positioning devices might include a first positioning device tracking a first target on a left side of the road forming machine and a second positioning device tracking a second target on the right side of the road forming machine; a second set of devices might include a third device tracking the first target and a fourth device tracking the second target; using these pairs of devices, an elevation of each side of the machine can be found (e.g., using the process described below independently for each of the first and second targets), and, from there, a cross-slope of the machine can be calculated (e.g., by dividing the difference in the blended solution of the elevation for each target by the known distance between the targets). These sets of positioning devices can then be leapfrogged pair-wise.

Figure 2:
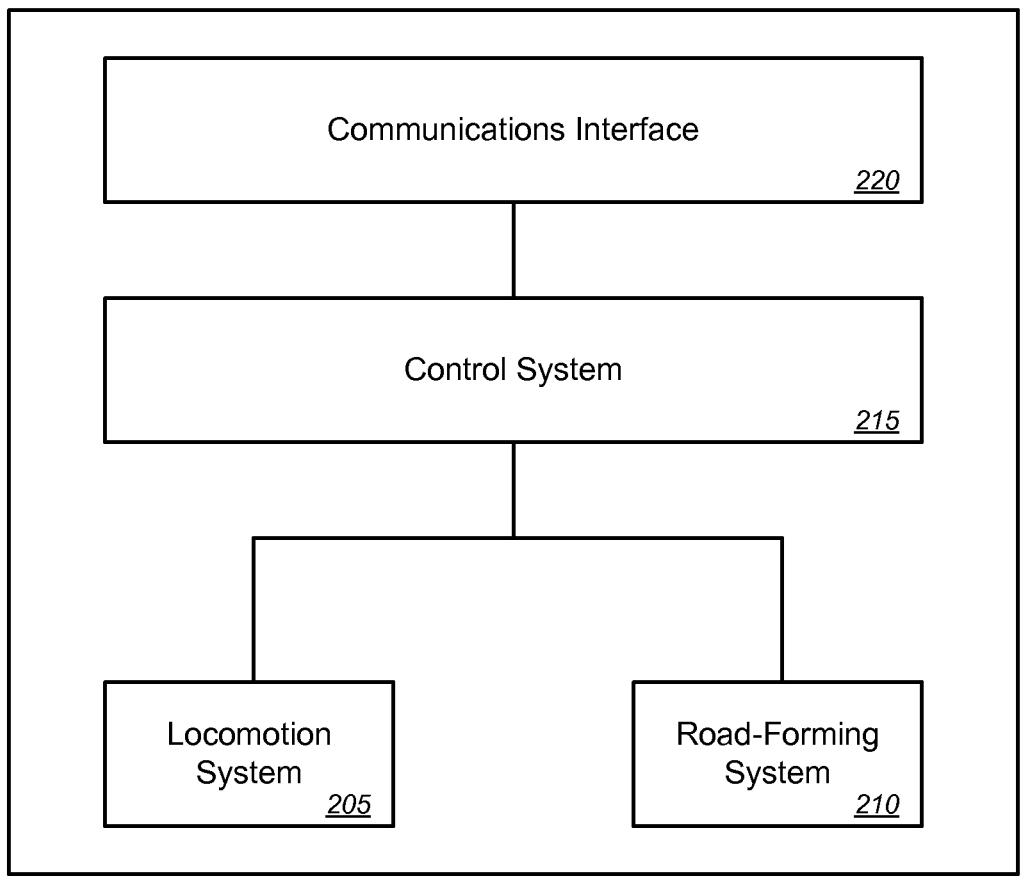
FIG. 2 is a simplified block diagram illustrating a generic road-forming machine, in accordance with various embodiments.

FIG. 2 is a simplified block diagram illustrating a generic road-forming machine 200, in accordance with various embodiments. (It should be noted that, although the description herein generally refers to road-forming machines, embodiments are not so limited, and various embodiments can be used to control any type of vehicle, in including in particular heavy equipment vehicles, which include road-forming machines and other construction equipment, tractors, heavy-duty trucks, and the like.) The generic road-forming machine can represent any suitable type of machine, including without limitation those described above, as well as the specific (but not limiting) examples depicted in FIGS. 3 and 4. The generic machine 200 comprises a locomotion system 205. The locomotion system 205 can include any components that provide movement for the machine 200, including without limitation engine, drivetrain, suspension, wheels, tracks (or other ground-contact components), steering systems and components, braking systems and components, and/or the like. The machine 200 might further comprise a road-forming system 210, which can include any of a variety of tools or components designed to form, shape, move, extrude, compact or otherwise manipulate a ground surface, such as a dirt underbed for a road, a paving material (e.g., concrete, asphalt, etc.).

In an aspect, the machine 200 further comprises a control system 215, which can comprise a special-purpose computer or a programmed general-purpose computer (general examples of which are described below with regard to FIG. 9). The control system 215 communicates with various systems of the machine 200 (including without limitation those described above) and controls the operation of the machine 200, including without limitation the operation of the locomotion system 205 and the road-forming system 210. In some respects, the control system 215 operates in response to operator input, while in other respects, the control system 215 provides automated control over machine 200 operations. In particular embodiments, for example, the control system 215 can be loaded with a design model for the project and can operate the machine 200, largely autonomously, to conform with the design model. The design model might be, for example, a terrain model and/or a corridor model. In an aspect, a terrain model, which is typically known as a triangulated irregular network ("TIN") model, can represent a surface (such as a road surface to be formed) as a set of contiguous, non-overlapping triangles. A corridor model is often defined as a parametric associative model, where elements of the design surface are defined as surface elements created using parameters such as offset and cross slope; the offsets and slopes can vary along the length of the object being constructed based on parameters such as distance along the road.

In other cases, the control system 215 might involve more user interaction; for example, the control system might accept user input to modify parameters specified by the model to account for site-specific conditions or events, and/or the control system, rather that providing autonomous control over other machine 200 systems, might provide guidance to an operator who manually controls such systems.

The machine 220 can also include a communications interface 220, which might be integrated with the control system 215 or otherwise in communication with the control system 215. The communication interface 220 can include any hardware or software necessary to provide communication between the control system 215 and external devices, such as ports for wired communication (e.g., serial ports, Ethernet ports), wireless radios (e.g., Bluetooth™ radios, 802.11x radios, cellular radios and other standard or proprietary radio frequency (RF) communication radios). In an aspect, the communication interface 220 provides connectivity between the machine 200 (or more precisely, the control system 215) and various data sources, including office computers and field computers (which can be used to upload the project design model to the control system 215) and position-measurement devices, from which the control system 215 can receive position data (e.g., as described in further detail below) to ensure that the as-built project remains consistent with the design model.

It should be appreciated that the machine 200 depicted in FIG. 2 is illustrated, and described, with a high degree of generality, and that a typical road-forming machine will have many other components and systems. The machine 200 is described herein merely for purposes of illustrating the concepts of certain embodiments with regard to controlling a wide variety of road-forming machines, which necessarily will feature different types of systems and components to accomplish various road-forming tasks.

Figure 3:
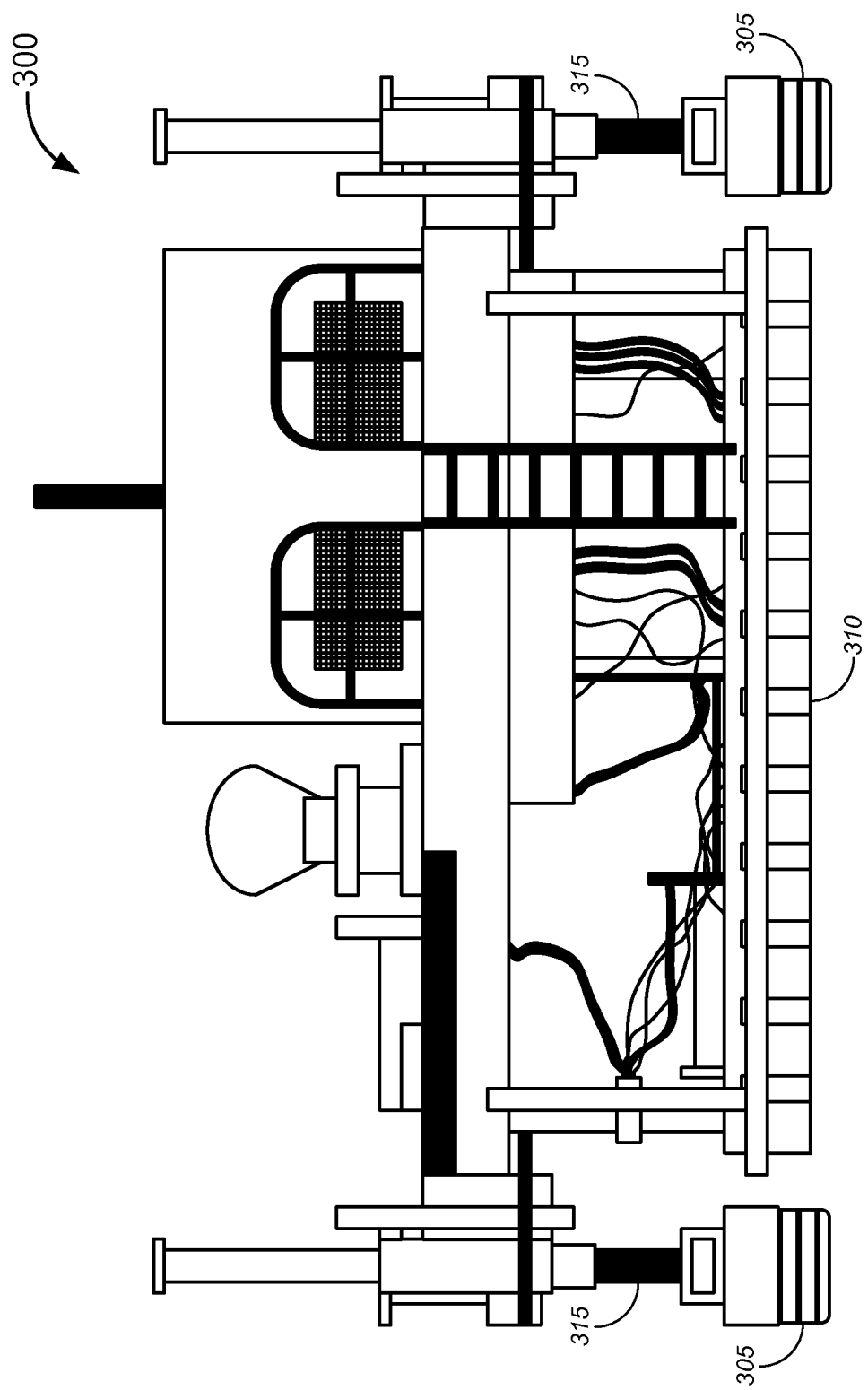
FIG. 3 illustrates a paving machine, in accordance with various embodiments.

For instance, FIG. 3 illustrates a paving machine 300, in accordance with various embodiments, which can be considered one specific type of road-forming machine, which can form a road surface by depositing and/or extruding paving material to form a road surface. The paving machine 300 might be a slipform paver (or "white paver") that extrudes concrete provided by separate vehicles, or it might be an asphalt paver that deposits asphalt from a hopper on the machine 300 itself. In either case, the paving machine might have a locomotion system that comprises a set of tracks 305, which provide locomotion of the machine 300. The operation of such machines can also include forming curbs, jersey barriers, or other continuous structures, and such operation should also be considered road-forming, as that term is used herein. The paving machine 300 might also comprise a communication interface and/or a control system, which are (not illustrated on FIG. 3 but described above with respect to FIG. 2). The control system, for example, can control operation of the locomotion system (including the tracks), for example, by controlling a speed of the tracks and/or steering of the machine through the tracks, in accordance with the techniques described in further detail below.

Additionally, the paving machine 300 might comprise a paving system, which can include apparatus 310 for depositing, extruding, and/or otherwise forming a paving material on a road surface, as well as a set of legs 315 that control a height of the apparatus 310 from the ground surface on which the tracks 305 are situated. The control system can control various aspects of this paving system, for example to set an elevation of the top surface of the paving material, to control the speed at which paving operations are performed, and/or the like.

Figure 4:
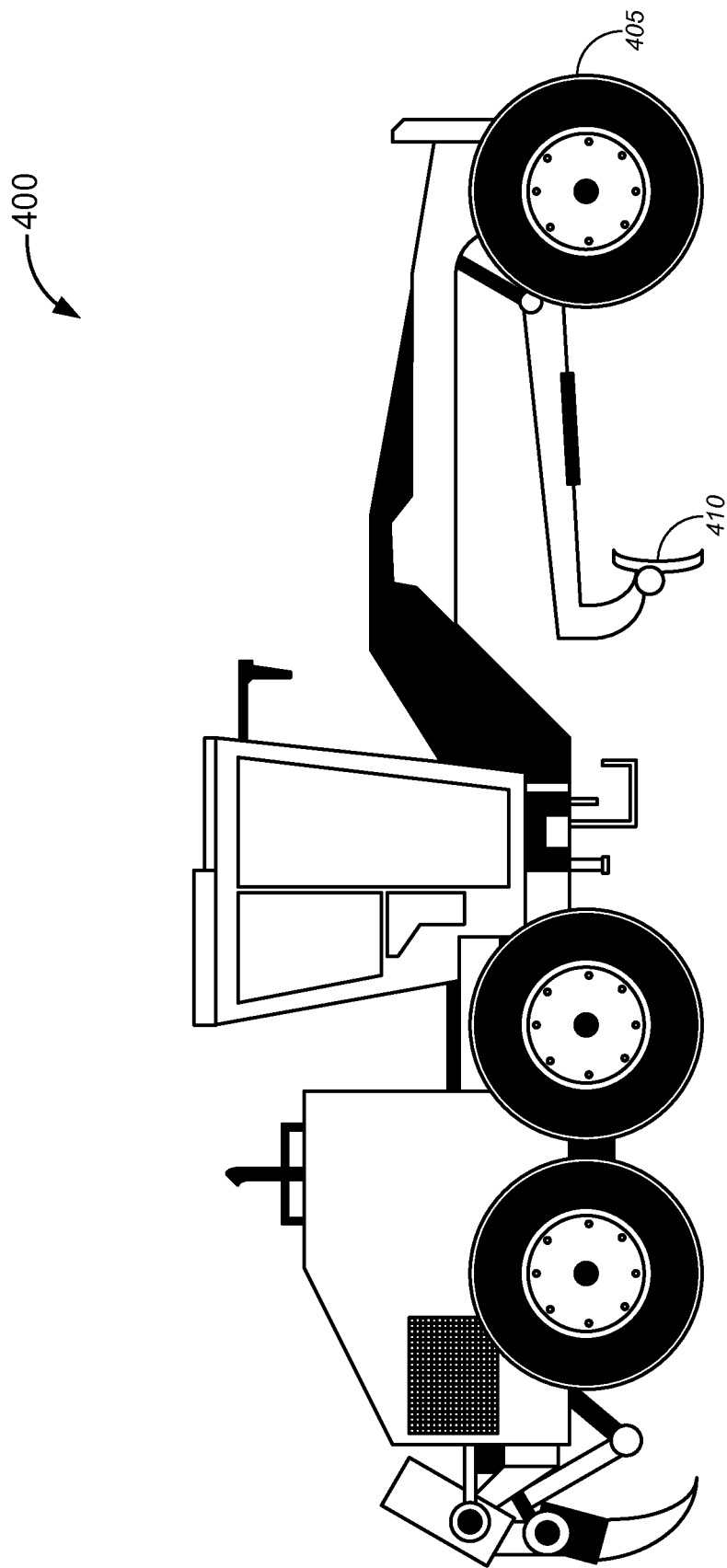
FIG. 4 illustrates a motor grader, in accordance with various embodiments.

FIG. 4 illustrates a motor grader 400, in accordance with various embodiments, which can be considered another example of a road-forming machine, and which can form a road surface, e.g., by removing and/or moving material to form an underbed of the road surface, and/or by moving and/or removing material from the road surface itself. Like the paving machine described above (and all road-forming machines more generally), the motor grader 400 can include a control system and/or a communication interface (not illustrated on FIG. 4), which can function as described above with regard to FIG. 2. The motor grader 400 might also include a locomotion system, which can include wheels 400, as well as an engine, drivetrain, steering system, and/or the like, as well as a road-forming system, which in this case can include a cutting blade 410 and apparatus for orienting the cutting blade 410. Both the locomotion system and the road-forming system can be controlled by the control system, as described above with respect to FIG. 2.

Figure 5:
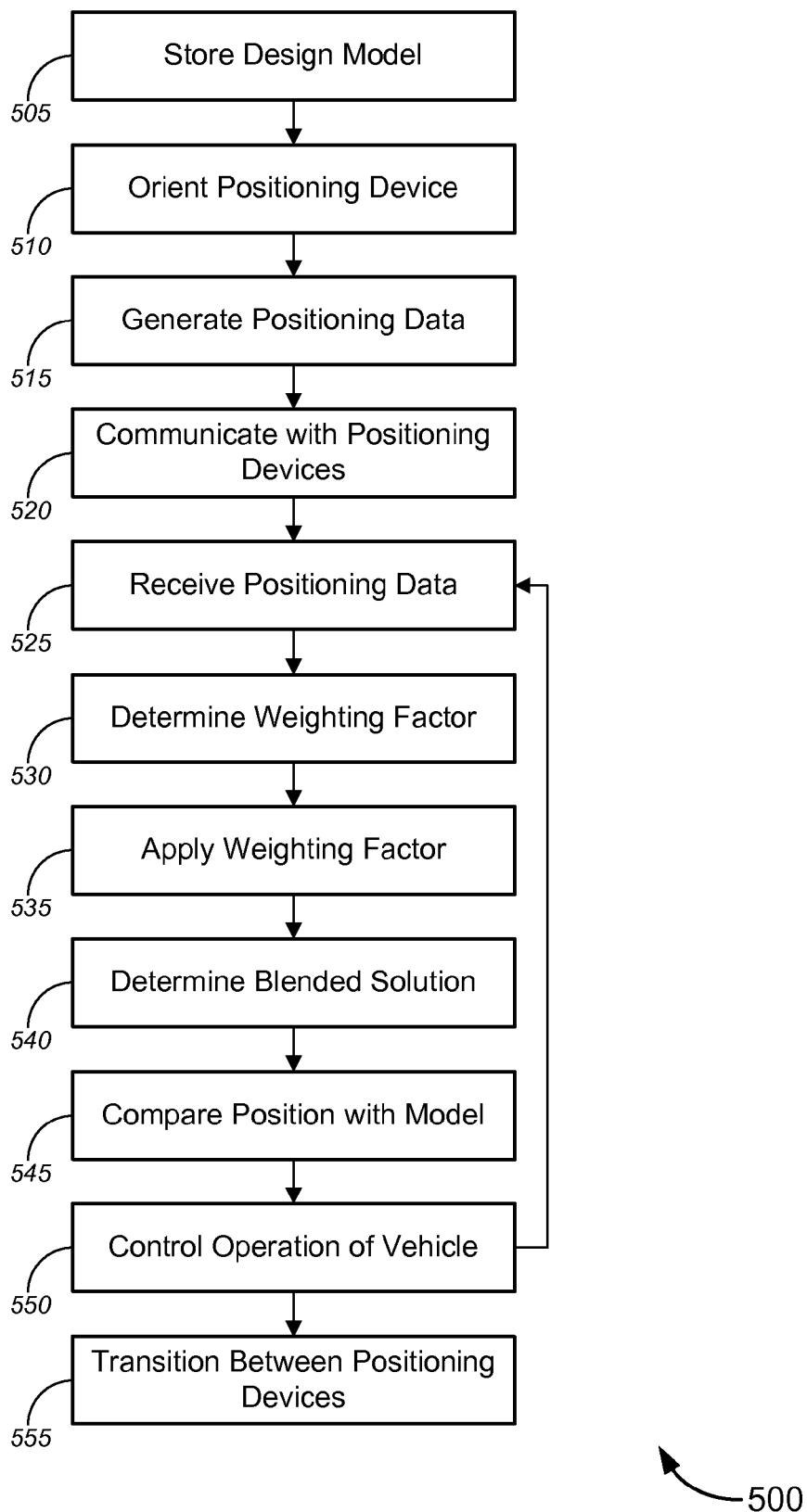
FIG. 5 is a process flow diagram illustrating a method of controlling a road-forming machine, in accordance with various embodiments.

Although FIG. 2 illustrates a road-forming machine in general, and FIGS. 3 and 4 illustrate specific examples of such machines, the skilled reader should understand that embodiments are not limited to these specific examples. Rather, embodiments can include any type of road-forming machine (or any type of machine more generally) that can operate in accordance with the techniques and principles described herein. For example, FIG. 5 illustrates a method 500 of controlling a road-forming machine in accordance with one set of embodiments. While the techniques and procedures of FIG. 5 are depicted and/or described in a certain order for purposes of illustration, it should be appreciated that certain procedures may be reordered and/or omitted within the scope of various embodiments. Moreover, while the method illustrated by FIG. 5 can be implemented by (and, in some cases, are described below with respect to) the systems (including without limitation control systems) and machines illustrated by FIGS. 1-4 (or components thereof), these methods may also be implemented using any suitable hardware implementation. Similarly, while the systems of FIGS. 1-4 (and/or components thereof) can operate according to the methods illustrated by FIG. 1 (e.g., by executing instructions embodied on a computer readable medium), the systems can also operate according to other modes of operation and/or perform other suitable procedures.

The method 500 of FIG. 5 might comprise storing, e.g., in a control system, a design model for a road-forming project (block 505). As noted above, such a model may be created by an office computer, or another appropriate device, and transmitted or otherwise uploaded to the control system of a road-forming machine. (Alternatively, in some embodiments, the control system itself might be used to create or update a design model.) In an aspect, a design model can specify dimensions and positions of project features. Merely by way of example, with regard to a road, the design model might specify local coordinates (or, alternatively, latitude and longitude coordinates) for edges of the road and an elevation of the crown and/or the edges of the road, with coordinates provided for various points (spaced as frequently as necessary) along the length of the road. Such a model can be stored on a computer readable medium (e.g., by a control system or other device) and can serve as a reference against which the project or a project feature (e.g., a road) is built.

The skilled reader can appreciate that, in order to maintain fidelity to the model, the road-forming machine must maintain an awareness of the position of whatever road-forming system it includes (which generally is a function of the position of a reference point on the machine itself, such as the position of an optical target, a GPS receiver, and/or the like), so that the formed road surface (or under bed, etc.) dimensionally and positionally satisfies the constraints imposed by the model. As noted above, in some cases, the road-forming machine can determine its own position using onboard facilities, but this technique often does not provide sufficient accuracy and/or precision. As a result, many embodiments employ the use of external positioning devices to provide accurate position data to the machine.

Hence, the method 500 can further include orienting a positioning device (block 510) and generating position data with the positioning device (block 515). As described above, a number of different positioning devices can be used in accordance with different embodiments, and techniques for orienting a positioning device will vary according to the device. In general, however, orienting a positioning device will comprise establishing a known position of the positioning device and orientation relative to a global or local coordinate system. Techniques can include GNSS position solutions, a backsight to a known reference points, photogrammetric position solutions (e.g., using photographic observation and bundle adjustment calculations), and/or any other suitable technique for determining the position of, e.g., a total station. Once the positioning device has been oriented, it can generate position data about the current position of the road-forming machine (or, as noted below, a specific target on the road-forming machine). Once again, the technique for generating position data will vary according to the nature of the positioning device. Merely by way of example, a total station might calculate a heading (e.g., azimuth and inclination) from the device to the road-forming machine and a distance to the road-forming machine (e.g., using laser ranging). From this data, and the known position/orientation of the positioning device, position data indicating a position (or an estimated position) of the road-forming machine can be generated.

For instance, a particular embodiment, the position measurement device might generate, and/or transmit to the control system, a measured position of an optical target (or other reference point) on the road-forming machine, and the control system might be programmed with instructions to derive a position of one or more points of interest on the machine (such as positions, in three dimensions, of each endpoint of a bottom surface of a motor grader blade, of each lateral endpoint of an extrusion system or pavement deposition system, and/or the like). Such points of interest might each have a known offset from the reference point, and, as such, the position of each such point can be known in relation to the reference point. Hence, in determining the position of the road-forming machine, the control system might actually determine the position of one or more such points of interest relative to the position of the machine and/or a reference point thereon. As noted above, a set of two or more reference points (e.g., optical targets) can be used; for example, with one reference point corresponding to a first lateral end of a paving system and a second reference point corresponding to a second lateral end of the paving system (the lateral ends together defining the width of the road surface being formed), and in such cases, the procedures described herein can be performed with separate positioning devices finding the positions of each reference point (such that each set of positioning devices include one device measuring each reference point, and each set can be leapfrogged together, with corresponding devices from each set providing data that is analyzed to calculate a position of a particular reference point).

As noted, various embodiments employ multiple positioning devices (or multiple sets of positioning devices), and these techniques can be used sequentially or in parallel in a two or more different devices to generate different sets of position data with each positioning device (and, as noted above, a multiple-device system might employ a leapfrog technique in which devices are moved to a new position and oriented once they no longer contribute at their old position). Each of these devices might transmit its respective position data (using any suitable technique and/or equipment, as described above) for reception by the control system of the road-forming machine (or another computer responsible for using such position data, as described below). The generation and transmission of position data from each positioning device can be performed periodically on any suitable interval.

The method 500 can further comprise communicating, by the control system of the road-forming machine (or another computer), with each of the positioning devices (block 520). This communication enables the control system to receive the transmitted position data. In one aspect, the control system (or other computer) might communicate with a all of the positioning devices on a single radio, for example using time slots in a single radio transmission epoch. The functionality allows the road-forming machine to have only one radio, instead of requiring different radios to obtain position data from different positioning devices, each on different channels and on different communications ports to the computer. Instead, the system might have one radio on the machine on one radio channel, which is split into four timed slots over which the four positioning devices can join and leave the radio network without causing any disruption to operations, allowing the machine to be tracked through leapfrogging processes. This functionality also reduces the administrative burden on the operator of coordinating different radios and channels as the control system transitions between different positioning devices (as described below). U.S. Pat. No. 8,494,561, titled "Radio Network List for Vehicle Control and Real Time Position Data" describes one technique that can be used to communicate with multiple positioning devices with a single radio. Another communication technique, involving mesh networking, that can be used in various embodiments is described in U.S. Pat. No. 7,307,710 B2, titled "Surveying Methods and Apparatus" and U.S. Pat. No. 7,423,742, titled "Surveying Systems and Methods."

Correspondingly, the method 500 can include receiving (e.g., with a control system of a road-forming machine or other vehicle) position data from two or more position measurement devices (block 525). In accordance with a set of embodiments, the control system (or other computer system responsible for determining the position of the road-forming machine) will calculate a best position solution for the position of the machine, using position data received from one or more of the positioning devices. In some cases, this best position will be a blended solution that uses weighted values of position data from two or more positioning devices to calculate the position of the machine at a given point in time.

Hence, the method 500 can comprise, in some embodiments, determining a weighting factor to apply some or all of the sets of positioning data (block 530). In some cases, the control system might use position data from one positioning device exclusively to determine the machine's position at a given time; in this case, that data might be given full weight (e.g., a weighting factor of 1.0, in some embodiments), and data from all other positioning devices might be given no weight (e.g., a weighting factor of 0.0 in some embodiments). More typically, the control system will use position data from two (or sometimes more) positioning devices to determine a position solution, and the weighting can vary from effectively weighting one data set at 100% to effectively weighting the other data set at 100%. (In some cases, each set of position data might be assigned its own weighting factor, and the sum of the positions multiplied by their weighting factors might serve as the blended solution; in other cases, a single weighting factor might be applied to the group of position solutions as a whole; likewise, a weighting factor can expressed as a percentage of influence of each positioning device, fractions summing to unity, or using any other desired notation—regardless of how the weighting factor is expressed, the concept remains the same: to determine how much each set of position data will influence the calculated blended position solution.) Moreover, this weighting can be recalculated periodically, such that the blended position solution will weight different sets of position data differently over time.

Merely by way of example, the machine might be near a first positioning device at time A; in determining the blended solution at this time, the control system might weight the position data from the first positioning device at 100% and the position data from a second positioning device at 0%. As the machine travels away from the first positioning device and toward the second positioning device, this weighting might be recalculated, such that, at time B, data from the first device is weighted at 95% and data from the second device is weighted at 5%; at time C, data from the first device might be weighed at 75% and data from the second device might be weighed at 25%, and so forth, until at time X, when the machine is very near the second positioning device, data from the first device might be weighted at 0% and data from the second device might be weighted at 100%.

In implementation, the determination of weighting factors may be more complex, but this simple example illustrates how a control system can transition gradually from using the data from one positioning device exclusively (or almost exclusively) to using the data from another positioning device exclusively (or almost exclusively). Moreover, using such weighting factors, this transition can be accomplished without any discontinuity in the calculated blended solution and/or without requiring the machine to cease operations to switch positioning devices.

In some embodiments, the determination of weighting factors can be parametric, such that the weighting factor applied to one or more sets of position data varies according to one or more specified parameters. As illustrated by the example above, one such parameter can be distance between the machine and a positioning device (or relative distances between the machine and each of two or more positioning devices). In other cases, a parameter that can influence the weighting factor is the signal strength of the signal received from a positioning device (or the relative strengths of two or more such signals received from different positioning devices). Other parameters are possible as well. For instance, an operator might provide user input to favor one positioning device over others, and this input might be used as a parameter (which might or might be dispositive in determining the weighting factor). As another example, positioning devices might include, with the position data, information about the quality or confidence of the position estimate provided by each positioning device, and this information might be used as a parameter in determining the weighting factor.

As another example, some embodiments can have the ability to monitor respective amounts of noise in different positioning device solutions, and relative amount of noise in different solutions can be used vary the weighting factor thereby diluting the influence of the noisy positioning system. Merely by way of example, if a first device has a line of sight that passes over a large area of hot asphalt (in summer) whereas a second device has a sight line over dirt/grass and is less affected by heat generated refraction, the solution from the second device might be weighted more heavily in the calculation of the blended solution.

Figure 6:
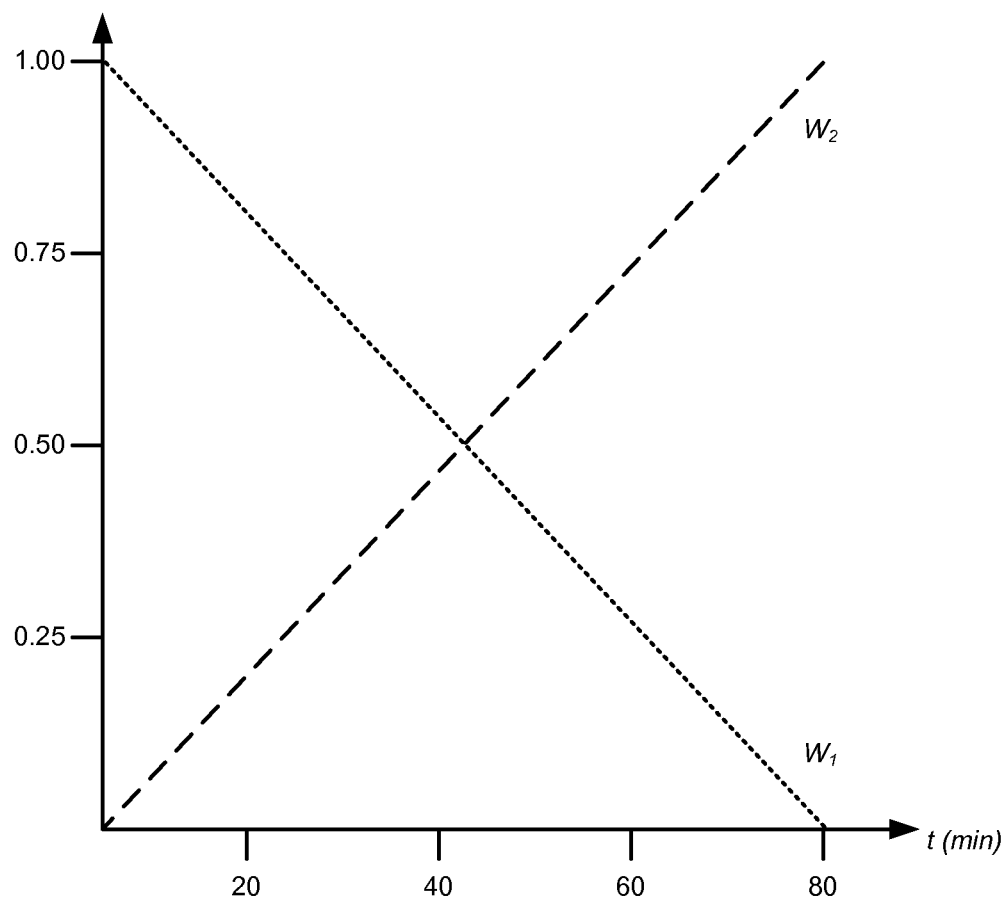
FIGS. 6 and 7 are plots illustrating exemplary relationships between weighting factors and time.
Figure 7:
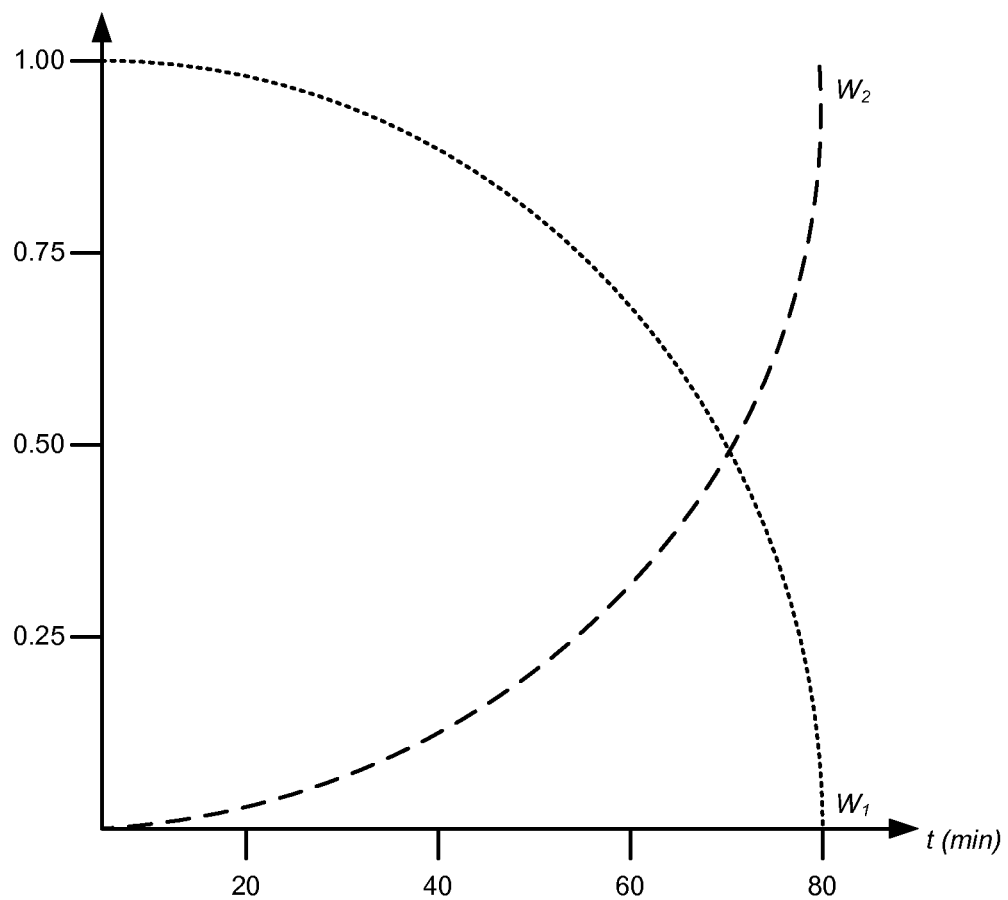

In some cases, the weighting factor might vary linearly according to the parameters. For example, if relative distances from two positioning devices are the parameters from which weighting factors are determined, the weighting factor applied to each positioning device vary linearly ratio of one distance to the other distance. Such a situation is illustrated by FIG. 6, which depicts a plot 600 of the weighting factors ($W_1$ and $W_2$) that vary linearly over time (for example, as the machine travels along a path between a first positioning device and a second positioning device). Alternatively, a weighting factor might vary non-linearly with respect to one or more parameters (e.g., based on the square of the relative distances or a logarithm of the relative signal strengths, to name two examples). FIG. 7, for example, displays a plot 700 of weighting factors ($W_1$ and $W_2$) that vary non-linearly over time. (Either of the plots 600 and 700 could also plot weighting factors against distance traveled with similar curves.) Such factors might vary with the square of the signal strength of the first positioning device, such that when signal begins to degrade, the system relatively rapidly transitions toward weighting the second positioning system more heavily. Depending on the implementation, the weighting factors might be determined from multiple parameters and might have linear and/or non-linear relationships with one or more parameters. For example, in some cases, the weighting factor might be determined from a first parameter that considers the relative distance of the machine to each of two or more positioning devices and a second parameter that considers relative signal strengths of signals received from each of the devices. If the distance is considered relatively more important, that parameter might have a multiple, linear relationship with the weighting factor (such as 2× the parameter), while the second parameter, relating to the signal strength might have a lower multiple or might have a non-linear relationship to the weighting factor (e.g., the log of signal amplitude or signal to noise ratio).

At block 535, the method 500 can comprise applying the determined weighting factor(s) to the received sets of position data. In an aspect, a weighting factor can act as a multiplier, which, as noted above, indicates the relative weight that should be given each set of position data. Hence, applying a weighting factor to a set of data can comprise multiplying a position specified by the data by the weighting factor. (Of course, in other embodiments, the weighting factor can be applied in different ways). Based on the application of the weighting factor(s) to the received position data, the method can comprise determining a blended position solution for the position of the machine at that time (block 540). Depending on the expression of the weighting factors, and how they are applied, the techniques for determining the blended solution will vary. In an aspect, however, no matter how the blended solution is determined, that technique can result in a blended solution for the position of the machine that accords the proper weight to each of the received position fixes.

One example of how the weighting factor can be applied is expressed by the following equation:

$$P(x, y, z) = \left( \sum_{i=1}^{n} W_i P_i(x), \sum_{i=1}^{n} W_i P_i(y), \sum_{i=1}^{n} W_i P_i(z) \right) \quad \text{(Eq. 1)}$$

where $P(x,y,z)$ is the blended position solution (in three dimensions, x, y, and z), $P_i$ is the position indicated by an individual positioning device in a particular dimension (in which there are n positioning devices that are providing data that can influence the blended solution), and $W_i$ is the weight applied to the data provided by the individual positioning device, such that $$\sum_{i=1}^{n} W_i = 1 \quad \text{(Eq. 2)}$$

or, in other words, the sum of the weights given to all of the considered positioning devices, using the determined weighting factor, sums to one.

For example, using this technique, if a first positioning device indicated a position of (39° 53' 50.22018" N. Lat., 105° 6' 56.02356 W. Lon., 6265.3120' ASL) and a second positioning device indicated a position of (39° 53' 50.22016" N. Lat., 105° 6' 56.02355 W. Lon., 6265.3122' ASL), and the weighting factor for each device were determined to be 0.5, the blended solution of the machine's position could be calculated as follows:

$$P(x) = (0.5)(105°6'56.02356") + (0.5)(105°6'56.02355") = 105°6'56.02355" \text{ W. Lon.}$$

$$P(y) = (0.5)(39°53'50.22018") + (0.5)(39°53'50.22016") = 39°53'50.22017" \text{ N. Lat.}$$

$$P(z) = (0.5)(6265.3120) + (0.5)(6265.3122) = 6265.3121' ASL$$

Figure 8:
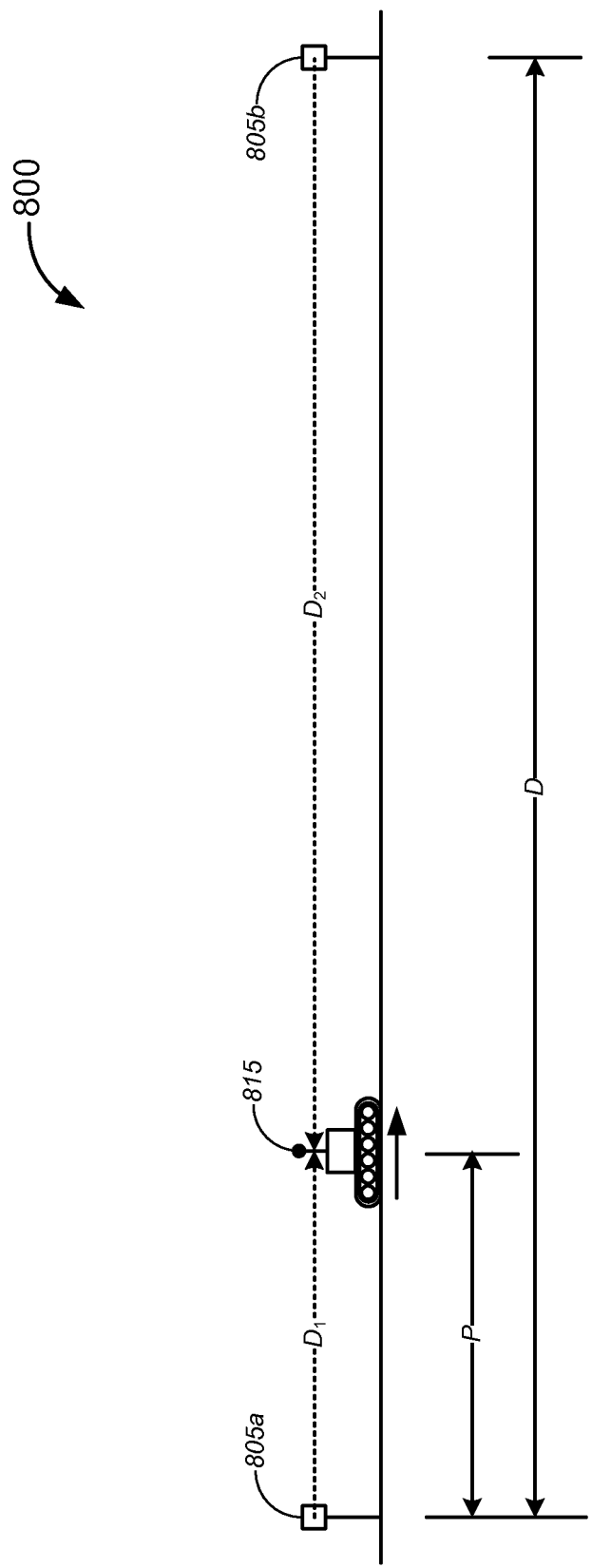
FIG. 8 illustrates a road-forming machine operating with two total positioning devices.

As another example, the relative distances between the machine and two different positioning devices can be used to determine weighting factors for the respective devices in a linear fashion. In a situation 800, illustrated by FIG. 8, in which two positioning devices 805*a* and 805*b* are 100 m apart and the machine 810 proceeds linearly between the two devices, the distance $D_1$ from the first device 805*a* to the machine 810 (or an optical target 815 on the machine, to be precise) might be measured as 25.025 m, and the distance $D^2$ from the second 805*b* device to the machine might be measured as 74.980 m. The weighting factor for the first device 805*a* then could be determined to be 0.75 and the weighting factor for the second device 805*b* could be determined to be 0.25 (since the machine 810 is approximately 25% of the distance from the first device 805*a* to the second device 805*b*, and the sum of the weighting factors is unity). Applying these weighting factors, the blended solution for the position of the machine 810 (in a single dimension between the two positioning devices) could be calculated as:

$$P = W_1 D_1 + W_2 (D - D_2) \quad \text{(Eq. 3)}$$

in which P is the blended solution for the position of the machine 810, $W_1$ and $W_2$ are the weighting factors assigned to the first positioning device 805*a* and second positioning device 805*b*, respectively, D is the distance between the two positioning devices 805, $D_1$ is the distance measured by the first positioning device 805*a* to the machine 810, and $D^2$ is the distance measured by the second positioning 805*b* device to the machine 810. With the values above, the blended solution can be calculated as:

$$P = 0.75(25.025) + 0.25(100 - 74.980) = 25.02375 \text{ m}$$

Of course, this example is oversimplified for the sake of illustration, in that it considers the position of the machine only in one dimension (a line between the two positioning devices 805) and the weighting factors are rounded from the actual ratio of $D_1/D_2$, but the skilled reader should understand that these principles can be applied to find the position of a machine in some or all of the three dimensions, assuming the position data received from the positioning devices includes three dimensions. For example, in road construction, elevation is of primary importance, while linear distance along the road is of lesser importance, in ensuring consistency of the road surface. Thus, in the example of FIG. 8, the system might merely need to find a position solution for elevation. In that situation, if the first positioning device 805*a* provided an elevation value $E_1$ of 500.00 m (above whatever local or global baseline value is used, and the second device 805*b* provided an elevation value of 500.05 m, the blended solution for the elevation could be calculated as:

$$E = 0.75(500.00) + 0.25(500.05) = 500.0125 \text{ m}$$

The skilled reader should also note that Equations 1-3 represent only a few of many different techniques available in various embodiments to apply weighting factors to position data received from a plurality of positioning devices, and that these examples are provided merely for purposes of illustration. Hence, these examples should not be considered limiting, and it should be understood that different embodiments can use a variety of techniques to apply a weighting factor to the received position data to determine a blended solution for the position of the machine.

For example, the weighting will often not be linear—for example, in the case of a machine traveling between two positioning device spaced at 200 m, in the range of 0-50 m from a particular positioning device, that device might be given a weight of 1 (and data from other positioning devices are disregarded), from 50 m to 100 m that device still has the higher weighting, but data from the other positioning device begins to be weighted as well. Thus, as you approach the 100 m mark, the second positioning device 200 m away from the first begins to influence the elevations such that at 100 m, data from both positioning devices are equally weighted. As the machine progresses to 150 m, the second instrument weights stronger and stronger until it takes over 100% for the distance from 150 to 200 (and perhaps another 250 m beyond the second device). It is in this period that operator can perform the leapfrog, with time to move the first device, drive to another location, reset up the first device, rejoin the radio network, and lock to the machine target and start to influence the positioning system in time to start the transition process all over again.

After a leapfrog, the first positioning device (in its new location) may lock to the target prior to the target passing the second positioning device. In such a case, the solution from the first positioning device might be assigned a weight of 0 until the machine passed the second positioning device. In some cases (e.g., tight bends of a race track), several (e.g., four) positioning devices may be used continuously from four fixed locations to provide bend cover, and the weighting method can be based on non linearity of the setup locations.

Returning to FIG. 5, once a blended solution for the position of the machine has been determined, the method 500 can include comparing the position of the machine (as expressed by the blended solution) with the design model (block 545). This operation ensures that the machine is positioned and operating in the proper manner to form the road (or other project) in conformity with the design model. This comparison can occur continuously and/or periodically (on whatever frequency is appropriate to attain the desired precision of fidelity to the model), and the operation of various vehicle/machine systems can be adjusted based on this comparison.

Thus, the method 500 can further comprise controlling the machine, based on the determined position of the machine. In one aspect, this can include controlling the machine to form a road (or otherwise perform) in accordance with the design model for the project. More particularly, in some embodiments, the method 500 can include controlling operation of a locomotion system and/or a road-forming system, based on a comparison of positions of the road-forming machine (and/or various points of interest thereof, as described above) with reference points specified by the design model. Merely by way of example, in the context of a paving machine, if the model indicates that the road surface should curve beginning at a certain point, when the machine (or more particularly the paving system thereof) reaches that point, the control system might adjust steering of the tracks of the paving machine to produce the curve specified by the model. Similarly, the paving machine might adjust the height of one of more legs that support the paving system to ensure that the formed road surface conforms to an elevation and/or cross-slope specified by the model at the location (e.g., according to governing local or global coordinate system) that the control system has determined to be the position of the paving system a given point in time. To use another example, the steering apparatus, wheel speed, and/or blade position/orientation of a motor grader can be controlled by control system to ensure consistency of a graded surface to a model of that surface.

A number of other factors might be involved in controlling operation of the machine. Merely by way of example, as disclosed in the Enhanced Control Application, some embodiments might provide a user interface and receive user input via the user interface (e.g., to select or prioritize particular positioning devices, to manually control various aspects of machine operation, etc.). Similarly, an aspect of controlling the machine might include providing output using such user interfaces, as described in the Enhanced Control Application. The operations described in the Enhanced Control Application, therefore, can be implemented with operations of the method 500, in accordance with various embodiments.

As shown by the arrow on FIG. 5 the method can reiterate from block 525, at which positioning data is received, with the determination of the weighting factor, the application of the weighting factor, and the determination of the blended solution for the machine's position (along with controlling the machine, as described above). Based on the disclosure herein, the skilled reader will appreciate that the weighting factor often will vary over time, for example, as the machine approaches one positioning device or travels farther from another. Hence, as the machine travels (or other factors change), the weighting factor can change, and the influence of each positioning device on the determined blended solution can change as well. Hence, this process for determining and applying the weighting factor can be repeated on whatever interval is appropriate.

For example, in an embodiment in which a Total Station is used as a positioning device, a typical Trimble™ Universal Total Station ("UTS") might provide position updates at 20 Hz and with less than 20 ms latency. The angle and distance values in the measurement systems in the UTS can be correlated to better than 5 ms, eliminating any positioning errors caused by the dynamic (moving) nature of the machine. In particular aspects, the interval might be selected based on the desired degree of continuity in the blended position solution. Based on the disclosure herein, for example, it can be seen that, in many cases, more frequent sampling and calculation of the blended solution will result in lower discontinuities in the determined position solutions.

As noted above, the blended solution for the position of the machine at a given time can vary from using exclusively (or almost exclusively) data from one positioning device to using exclusively (or almost exclusively) data from another positioning device. The method 500, then, can also include transitioning from a first position measurement device to a second position measurement device (block 535). In other words, if the control system were receiving first data from a first positioning device and second data from a second positioning device, the control system might perform a transition, over time, from a state in which the weighting factor disregarded the second data in determining a blended solution for a position of the vehicle to a state in which the weighting factor disregarded the first data in determining a blended solution for a position of the vehicle. A novel aspect of some embodiments is the ability to transition from one position measurement device without affecting operation of the road-forming machine. Hence, in some cases, the transition and/or position determination using data from a new position measurement device can be performed without interrupting movement of the road-forming machine or formation of the road surface. Alternatively and/or additionally, this continuous performance of road-forming operations can be accomplished without introducing a discontinuity in the formed road surface greater than a specified threshold value (which might be specified, as noted above, through user input, or which might be specified by the model itself, by default parameters in the control system, and/or the like). Such capabilities can be enabled by the techniques described above for determining a blended positioning solution.

The techniques described above can be repeated iteratively while positioning devices are "leapfrogged" as necessary to provide continuous guidance while the road-forming machine progresses with its operations. In one aspect of some embodiments, when one positioning device is shut down and moved forward in such a leapfrog process, and then reset and reconnected to the machine radio network, the road-forming machine can communicate to that positioning device the position of the target on the machine, based on the position derived from the remaining instrument tracking the machine, so that the search and acquire time for the newly-setup positioning device can be reduced, further automating the leapfrog process and expediting the device's ability to contribute its positioning data to the weighted solutions once again.

In another aspect, the leapfrog process can also be enhanced through the use of active target identifiers (for example, light emitting diodes that provide a recognizable pattern of emission or shape, radio identifiers, or the like, rather than merely a passive target, such as a prism) that are unique on each target (for example, as noted above, on a concrete paver, there might be two targets). This technique can ensure that, during that leapfrog, reset, search and acquire process, the positioning device cannot lock onto the incorrect target on the machine since it searches for a single unique signal identifier and will only lock to that source. By preventing a spurious lock to the wrong target by a positioning device, this technique can avoid problems like switching cross slopes, providing incorrect elevations, disorienting the machine and introducing other errors.

Figure 9:
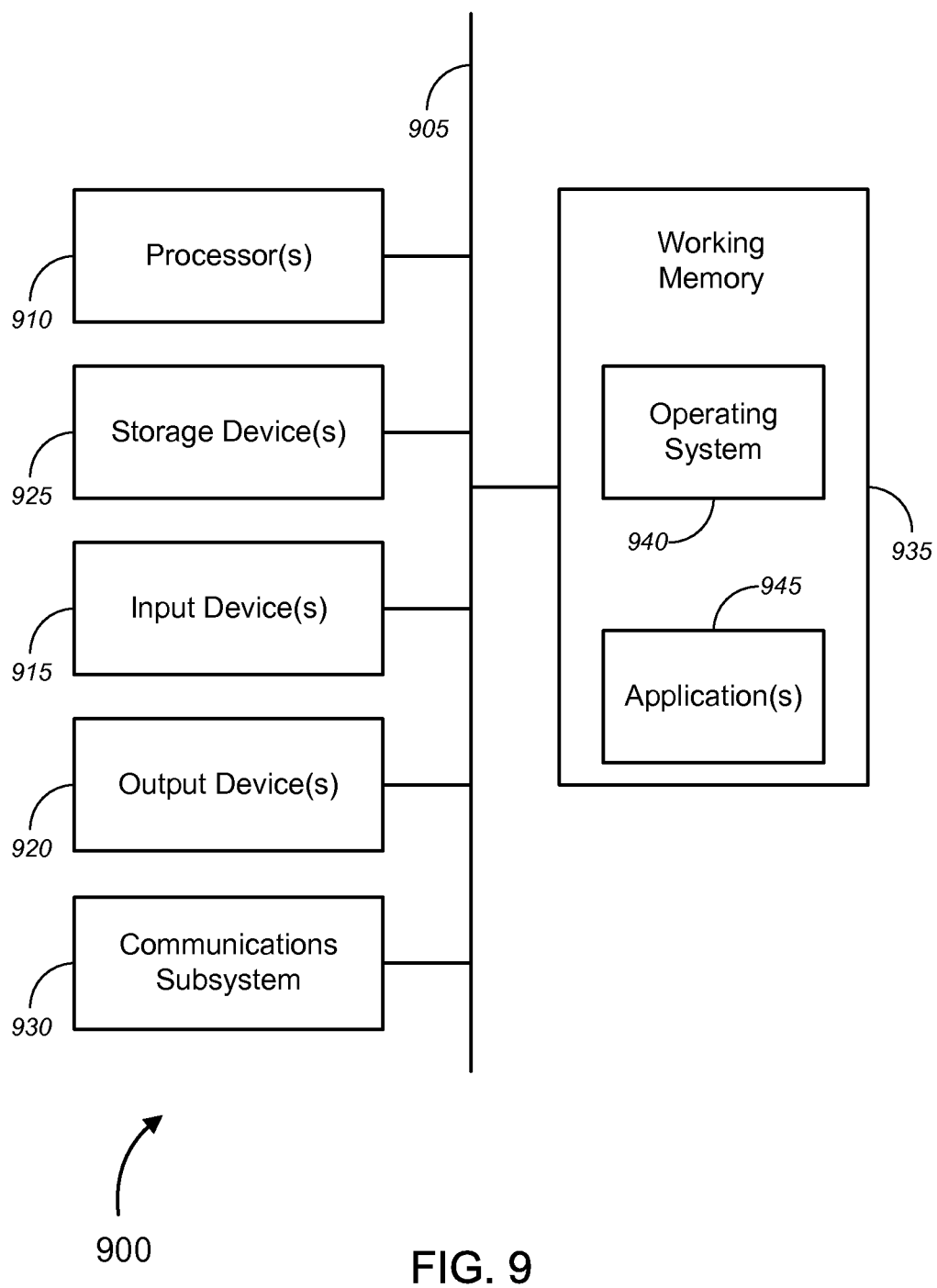
FIG. 9 is a generalized schematic diagram illustrating a computer system, in accordance with various embodiments.

FIG. 9 provides a schematic illustration of one embodiment of a computer system 900 that can perform the methods provided by various other embodiments, as described herein, and/or can function as a control system for a road-forming machine or other vehicle, an office computer, a field computer, a control system for a position measurement device, and/or the like. It should be noted that FIG. 9 is meant only to provide a generalized illustration of various components, of which one or more (or none) of each may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905 (or may otherwise be in communication, as appropriate). The hardware elements may include one or more processors 910, including without limitation one or more general-purpose processors and/or one or more special-purpose processors (such as digital signal processing chips, graphics acceleration processors, and/or the like); one or more input devices 915, which can include without limitation a mouse, a keyboard and/or the like; and one or more output devices 920, which can include without limitation a display device, a printer and/or the like.

The computer system 900 may further include (and/or be in communication with) one or more storage devices 925, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 900 might also include a communications subsystem 930, which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 930 may permit data to be exchanged with a network (such as the network described below, to name one example), with other computer systems, and/or with any other devices described herein. In many embodiments, the computer system 900 will further comprise a working memory 935, which can include a RAM or ROM device, as described above.

The computer system 900 also may comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 925 described above. In some cases, the storage medium might be incorporated within a computer system, such as the system 900. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 900) to perform methods in accordance with various embodiments of the invention. According to a set of embodiments, some or all of the procedures of such methods are performed by the computer system 900 in response to processor 910 executing one or more sequences of one or more instructions (which might be incorporated into the operating system 940 and/or other code, such as an application program 945) contained in the working memory 935. Such instructions may be read into the working memory 935 from another computer readable medium, such as one or more of the storage device(s) 925. Merely by way of example, execution of the sequences of instructions contained in the working memory 935 might cause the processor(s) 910 to perform one or more procedures of the methods described herein.

The terms "machine readable medium" and "computer readable medium," as used herein, refer to any medium that participates in providing data that causes a machine to operation in a specific fashion. In an embodiment implemented using the computer system 900, various computer readable media might be involved in providing instructions/code to processor(s) 910 for execution and/or might be used to store and/or carry such instructions/code (e.g., as signals). In many implementations, a computer readable medium is a non-transitory, physical and/or tangible storage medium. Such a medium may take many forms, including but not limited to, non-volatile media, volatile media, and transmission media. Non-volatile media includes, for example, optical and/or magnetic disks, such as the storage device(s) 925. Volatile media includes, without limitation, dynamic memory, such as the working memory 935. Transmission media includes, without limitation, coaxial cables, copper wire and fiber optics, including the wires that comprise the bus 905, as well as the various components of the communication subsystem 930 (and/or the media by which the communications subsystem 930 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900. These signals, which might be in the form of electromagnetic signals, acoustic signals, optical signals and/or the like, are all examples of carrier waves on which instructions can be encoded, in accordance with various embodiments of the invention.

The communications subsystem 930 (and/or components thereof) generally will receive the signals, and the bus 905 then might carry the signals (and/or the data, instructions, etc. carried by the signals) to the working memory 935, from which the processor(s) 905 retrieves and executes the instructions. The instructions received by the working memory 935 may optionally be stored on a storage device 925 either before or after execution by the processor(s) 910.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A heavy equipment vehicle, comprising:
    a locomotion system having one or more of an engine, drivetrain, and steering system;
    a road-forming system configured to manipulate a ground surface;
    a computer system in communication with one or more of the engine or the drivetrain, the computer system comprising a processor and a non-transitory computer readable medium having encoded thereon a set of instructions that are executable by the processor to:
        receive, from a first positioning device at a first location, first data indicating an estimated position of the heavy equipment vehicle at a first point in time;
        receive, from a second positioning device oriented at a second location, second data indicating an estimated position of the heavy equipment vehicle at the first point in time;
        determine a first weighting factor for the first data and a second weighting factor for the second data, wherein the first and second weighting factors specify a relative weight to be accorded to each of the first and second data at the first point in time;
        apply the first weighting factor to the first data;
        apply the second weighting factor to the second data;
        determine a blended solution for a first position of the heavy equipment vehicle at the first point in time, based at least in part on the first and second data and the first and second weighting factors;
        periodically determine the first and second weighting factors over time, wherein the first and second weighting factors vary over time, resulting in different weights being accorded the first data and second data over time; and
        determine a plurality of blended solutions for the position of the vehicle over a period of time, the plurality of blended solutions describing a substantially continuous curve during a transition, over the period of time, from a state in which the second weighting factor disregards the second data in determining a blended solution for a position of the heavy equipment vehicle to a state in which the first weighting factor disregards the first data in determining a blended solution for a position of the heavy equipment vehicle;
        control operation of at least one of the locomotion system or road-forming system, based on the determined plurality of positions of the vehicle, to continuously operate the heavy equipment vehicle without pause during the transition, wherein controlling operation of at least one of a locomotion system or a road-forming system of the vehicle comprises comparing the blended solutions for the position of the vehicle with a corridor model.

2. The heavy equipment vehicle of claim 1, wherein the heavy equipment vehicle is a road grader.

3. The heavy equipment vehicle of claim 1, wherein the heavy equipment vehicle is a road paving machine.

4. The heavy equipment vehicle of claim 1, wherein the heavy equipment vehicle is a tractor.

5. A method, comprising:
    orienting a first positioning device at a first location;
    orienting a second positioning device at a second location;
    generating, using the first positioning device, first data indicating an estimated position of a vehicle at a first point in time, wherein the vehicle is a heavy equipment vehicle;
    generating, using the second positioning device, second data indicating an estimated position of the vehicle at the first point in time;
    receiving, at a computer, the first and second data;
    determining, with the computer, a first weighting factor for the first data and a second weighting factor for the second data, wherein the first and second weighting factors specify a relative weight to be accorded to each of the first and second data at the first point in time;
    applying, with the computer, the first weighting factor to the first data;
    applying, with the computer, the second weighting factor to the second data;
    determining, with the computer, a blended solution for a first position of the vehicle at the first point in time, based at least in part on the first and second data and the first and second weighting factors; and
    controlling, with the computer, operation of at least one of a locomotion system or road-forming system of the vehicle, based on the blended solution for the first position of the vehicle, continuously operating the heavy equipment vehicle without pause during the transition, wherein the locomotion system has one or more of an engine, drivetrain, and steering system, and wherein the road-forming system is configured to manipulate a ground surface in the formation of a road surface, wherein controlling operation of at least one of a locomotion system or a road-forming system of the vehicle comprises comparing the blended solution for the first position of the vehicle with a corridor model.

6. The method of claim 5, wherein the blended solution for the first position of the vehicle comprises an elevation of the vehicle.

7. The method of claim 5, wherein the blended solution for the first position of the vehicle comprises a cross-slope of the vehicle.

8. The method of claim 5, wherein controlling operation of the vehicle further comprises comparing the blended solution for the first position of the vehicle with a terrain model.

9. The method of claim 5, wherein the first and second positioning devices indicate an estimated position of a first target on the vehicle, and wherein the blended solution is a first blended solution for a first point of interest on the vehicle, the method further comprising:
generating, using a third positioning device, third data indicating an estimated position of a second target on the vehicle;
generating, using a fourth positioning device, fourth data indicating an estimated position of a second target on the vehicle;
receiving the third and fourth data with the computer; and
determining a second blended solution for a second point of interest on the vehicle.

10. The method of claim 9, further comprising:
calculating a first elevation of the first point of interest on the vehicle; and
calculating a second elevation of the second point of interest on the vehicle.

11. The method of claim 10, further comprising:
calculating a cross-slope of the vehicle based on the first and second elevations.

12. The method of claim 5, further comprising:
repositioning the first positioning device;
communicating, with the computer, a position of a target on the vehicle, based at least in part on position data received from the second positioning device.

13. The method of claim 12, further comprising:
identifying, with the first positioning device, the target on the vehicle, from among a plurality of targets on the vehicle, using an active target identifier that is unique to the target, to prevent the first positioning device from spuriously locking to another one of the plurality of targets.

14. The method of claim 5, further comprising:
receiving additional data from one or more additional positioning devices; and
determining a third weighting factor for the third data; and
applying the third weighting factor to the third data;
wherein determining a blended solution for the first position of the vehicle at the first point in time is based at least in part on the first, second, and third data, and the first, second, and third weighting factors.

15. The method of claim 5, further comprising:
reapplying, with the computer, the first and second weighting factors to the first and second data to determine a blended solution for a second position of the heavy equipment vehicle at a second point in time, wherein the first and second weighting factors change over time.

16. The method of claim 5, wherein at least one of the weighting factors varies according to one or more specified parameters.

17. The method of claim 16, wherein the one or more parameters comprise a distance from the first positioning device to the vehicle and a distance from the second positioning device to the vehicle.

18. The method of claim 16, wherein the one or more parameters comprise relative signal strengths of signals from the first and second positioning devices.

19. The method of claim 16, wherein the at least one of the weighting factors varies linearly with at least one of the one or more parameters.

20. The method of claim 16, wherein the at least one of the weighting factor varies non-linearly with at least one of the one or more parameters.

21. The method of claim 16, further comprising:
periodically determining the first and second weighting factors based on the one or more specified parameters, wherein the weighting factors vary over time, resulting in different weights being accorded the first data and second data over time; and
determining a plurality of blended solutions for the position of the vehicle over a period of time, the plurality of blended solutions describing a substantially continuous curve during a transition, over the period of time.

22. The method of claim 5, further comprising:
communicating with the first positioning device and the second positioning device using a single radio on the vehicle.

23. The method of claim 22, wherein communicating with the first positioning device and the second positioning device comprises communicating with each device in a different epoch on a common radio channel.

24. The method of claim 5, further comprising:
performing a transition, over time, from a state in which the second weighting factor disregards the second data in determining a blended solution for a position of the vehicle to a state in which the first weighting factor disregards the first data in determining a blended solution for a position of the vehicle.

25. The method of claim 24, wherein controlling operation of the vehicle comprises continuing operation of the vehicle without pause during the transition.

26. A system, comprising:
a processor; and
a non-transitory computer readable medium having encoded thereon a set of instructions that are executable by the processor to:
receive, from a first positioning device at a first location, first data indicating an estimated position of a vehicle at a first point in time, wherein the vehicle is a heavy equipment vehicle;
receive, from a second positioning device oriented at a second location, second data indicating an estimated position of the vehicle at the first point in time;
determine a first weighting factor for the first data and a second weighting factor for the second data, wherein the first and second weighting factors specify a relative weight to be accorded to each of the first and second data at the first point in time;
apply the first weighting factor to the first data;
apply the second weighting factor to the second data;

determine a blended solution for a first position of the vehicle at the first point in time, based at least in part on the first and second data and the first and second weighting factors; and control operation of at least one of a locomotion system or road-forming system of the vehicle, based on the blended solution for the first position of the vehicle, continuously operating the heavy equipment vehicle without pause during the transition, wherein the locomotion system has one or more of an engine, drivetrain, and steering system, and wherein the road-forming system is configured to manipulate a ground surface in the formation of a road surface, wherein controlling operation of at least one of a locomotion system or a road-forming system of the vehicle comprises comparing the blended solution for the first position of the vehicle with a corridor model.

27. A vehicle comprising the system of claim 26.

28. The system of claim 26, further comprising:
the first positioning device; and
the second positioning device.

29. The system of claim 28, wherein the first positioning device comprises a first total station and the second positioning device comprises a second total station.

30. An apparatus, comprising:
a non-transitory computer readable medium having encoded thereon a set of instructions that are executable by a computer to:
receive, from a first positioning device at a first location, first data indicating an estimated position of a vehicle at a first point in time, wherein the vehicle is a heavy equipment vehicle;

receive, from a second positioning device oriented at a second location, second data indicating an estimated position of the vehicle at the first point in time;

determine a first weighting factor for the first data and a second weighting factor for the second data, wherein the first and second weighting factors specify a relative weight to be accorded to each of the first and second data at the first point in time;

apply the first weighting factor to the first data;

apply the second weighting factor to the second data;

determine a blended solution for a first position of the vehicle at the first point in time, based at least in part on the first and second data and the first and second weighting factors; and control operation of at least one of a locomotion system or road-forming system of the vehicle, based on the blended solution for the first position of the vehicle, continuously operating the heavy equipment vehicle without pause during the transition, wherein the locomotion system has one or more of an engine, drivetrain, and steering system, and wherein the road-forming system is configured to manipulate a ground surface in the formation of a road surface, wherein controlling operation of at least one of a locomotion system or a road-forming system of the vehicle comprises comparing the blended solution for the first position of the vehicle with a corridor model.

* * * * *